(12) United States Patent
Sawrie

(10) Patent No.: US 7,542,375 B2
(45) Date of Patent: Jun. 2, 2009

(54) METHOD FOR SIMULTANEOUS TRANSMISSION OF SOUNDWAVES AND, IN PARTICULAR, SONAR PULSES, WITHOUT INTERFERENCE

(76) Inventor: Matthew Sawrie, 751 Barclay, London, ON (CA) N6K 1K4

( * ) Notice: Subject to any disclaimer, the term of this patent is extended or adjusted under 35 U.S.C. 154(b) by 0 days.

(21) Appl. No.: 11/950,573

(22) Filed: Dec. 5, 2007

(65) Prior Publication Data

US 2008/0151693 A1    Jun. 26, 2008

Related U.S. Application Data

(60) Provisional application No. 60/868,590, filed on Dec. 5, 2006.

(51) Int. Cl.
   *G01S 15/02* (2006.01)
   *G01S 15/08* (2006.01)

(52) U.S. Cl. ......................... 367/99; 367/903

(58) Field of Classification Search ............... 367/99, 367/103, 105, 137, 903
   See application file for complete search history.

(56) References Cited

U.S. PATENT DOCUMENTS

| 5,079,751 | A | * | 1/1992 | Woodward | 367/99 |
| 5,905,692 | A | * | 5/1999 | Dolazza et al. | 367/103 |
| 2005/0052950 | A1 | * | 3/2005 | Klinnert et al. | 367/99 |
| 2008/0137483 | A1 | * | 6/2008 | Sawrie | 367/103 |
| 2008/0151693 | A1 | * | 6/2008 | Sawrie | 367/137 |

* cited by examiner

*Primary Examiner*—Dan Pihulic
(74) *Attorney, Agent, or Firm*—Standley Law Group LLP

(57) ABSTRACT

A system and method simultaneously transmits sound waves through a plurality of sonar elements without interference, such as for the purpose of tracking objects underwater. The system has a pulse generator with a plurality of transceivers connected to the pulse generator. A plurality of sonar elements is connected to the plurality of transceivers, with at least one sonar element per transceiver. A sonar signal is sent from the pulse generator to each sonar element, passing intermediately through a transceiver.

21 Claims, 1 Drawing Sheet

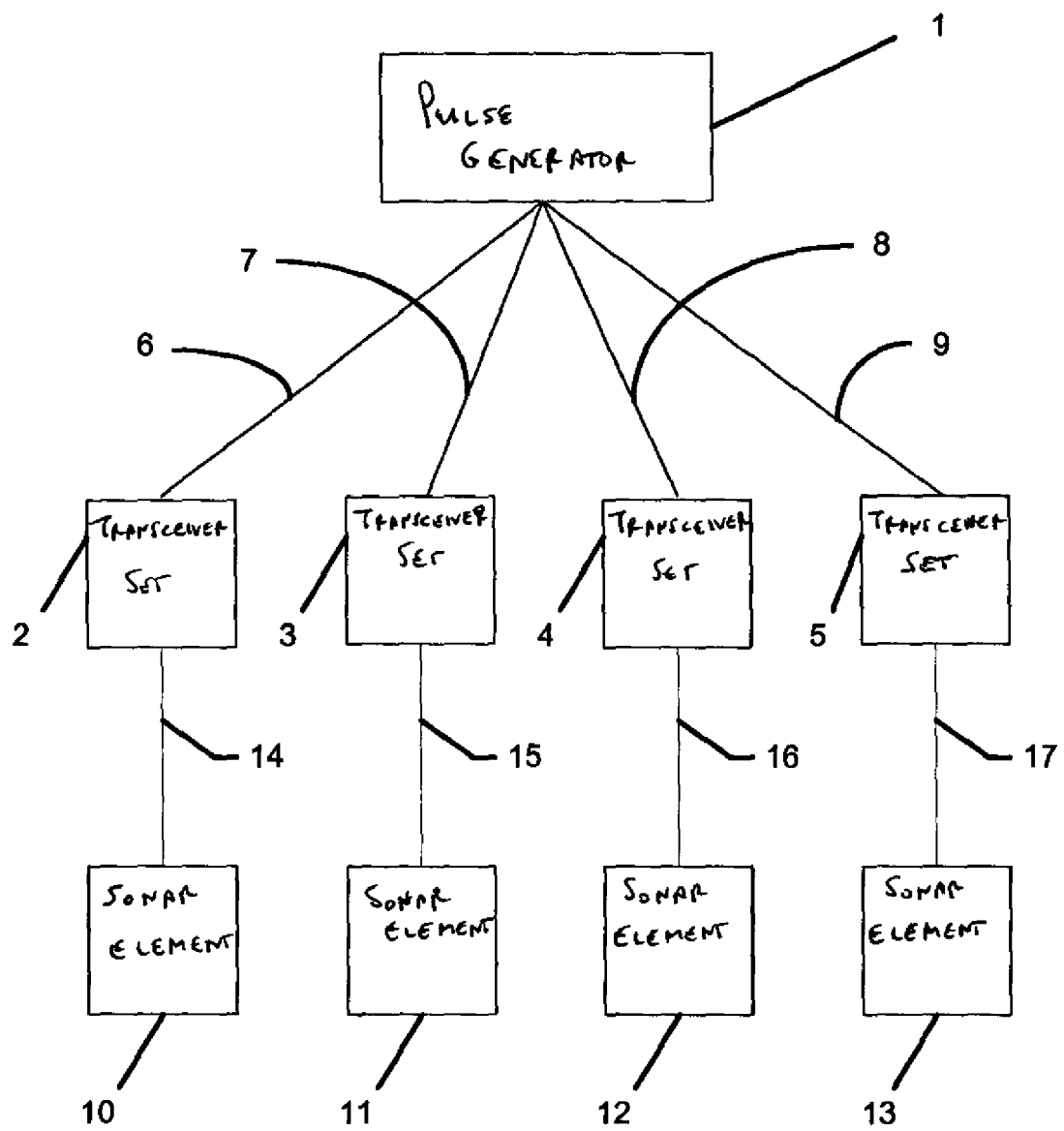

METHOD FOR SIMULTANEOUS TRANSMISSION OF SOUNDWAVES AND, IN PARTICULAR, SONAR PULSES, WITHOUT INTERFERENCE

CROSS-REFERENCE TO RELATED APPLICATIONS

This application is a non-provisional of U.S. provisional patent application 60/868,590, filed Dec. 5, 2006, which is incorporated by reference as if fully recited herein.

TECHNICAL FIELD

The invention relates generally to eliminating frequency, and in particular, soundwave interference, when tracking objects underwater. Specifically, the invention relates to a method of reducing interference between multiple adjacent sonar beams of the same or different frequencies. The method of the invention can be used in conjunction with the multi-beam sonar apparatus described in the U.S. Provisional Application No. 60/868,590. In addition, the method of the invention may be used with any apparatus utilizing frequencies or sound waves for the detection of target objects, such as medical ultrasounds, robotics and the like.

BACKGROUND OF THE ART

Conventional methods of reducing interference between multiple sonar pulses suffer from several limitations. One method utilizes a system that interconnects and synchronizes multiple same-frequency sonic sources that operate in close proximity to each other. The sonic sources are configured in a master-slave relationship. The master sonar unit functions as a controller that synchronizes the simultaneous firing of all the connected slave sonar units.

This method suffers from several disadvantages. First, a relatively sophisticated control communication network is required between the master and the slave units. This control communication network introduces delay between the signals reaching the different sonar units. Any delay in the signals reaching the different sonar units will cause the sonar units to generate sonar pulses which are not completely synchronized.

Second, the control communication network adds a level of complexity to the system as a whole and, moreover, to the cost of the system. Third, in this configuration, each sonar unit is utilizing its own pulse generator to send the signal to each transducer, thus adding a level of uncertainty in the synchronization of the sonar units, as well as to the overall cost. Fourth, the method can only be utilized with sonar units that transmit sonar pulses of the same frequency.

Another method used in radar systems utilizes a pulse trigger signal for synchronizing multiple radar systems operating in the same area. Subsequently the different radar systems generate radar pulses in accordance with pre-determined operating parameters (such as carrier frequency at which the radar pulses are transmitted and carrier frequency offset with respect to carrier frequencies used by other radar systems) and the synchronization provided by the pulse trigger signal.

One disadvantage of this method is the complexity and the cost of the system. Once again, another disadvantage is the potential delay that could be introduced by the pulse trigger signal and cause radar/sonar unites to generate radar/sonar pulses which are unsynchronized.

SUMMARY OF THE INVENTION

Accordingly, an object of some exemplary embodiments is to utilize a simple and cost effective method of synchronizing the sonar pulses generated by sonar units or elements operating adjacent to each other and in unity.

Another object of some exemplary embodiments is to eliminate the need for a control communications system and thereby the delay introduced by the various control communications means between adjacent sonar elements, producing the highest possible degree of synchronization between the sonar elements. As a result, interference between the sonar signals of adjacent sonar elements is not just reduced, but for all practical purposes eliminated.

An exemplary embodiment is achieved by utilizing a single pulse generator connected to multiple transceivers and sonar elements. By utilizing a single pulse generator, the need for a control communication system between the multiple transceivers and sonar elements is eliminated. Accordingly, the delay introduced by the control communication system and the synchronization signal that would be transmitted to all the sonar elements is eliminated.

Moreover, each connection between the single pulse generator, transceivers and the multiple sonar elements is designed and manufactured to the same configuration, size and specifications, such that the possibility of the signal reaching the different sonar elements at slightly offset times is practically eliminated.

In addition to the complete elimination of interference between pulses from adjacent sonar elements, an exemplary embodiment is also advantageous from a cost point of view due to the elimination of multiple pulse generators and any sophisticated communications network between the multiple sonar units or elements.

Another advantage of exemplary embodiments is that they are not limited to multiple sonar elements of the same frequency. Exemplary embodiments can work with multiple sonar elements of different frequency, such as those employed in the invention of U.S. Provisional Application 60/868,590.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which:

FIG. 1 is a block diagram illustrating an exemplary embodiment.

DETAILED DESCRIPTION OF A PREFERRED EMBODIMENT

Referring to FIG. 1, a system is provided in which a pulse generator 1 is connected through four sets of transceivers 2, 3, 4 and 5 to four sets of sonar elements 10, 11, 12 and 13. As used in this application, the term "set" applies to at least one unit of the recited entity, such as a transceiver, and it will generally apply to two or more units of the entity. Each set of sonar elements may correspond to the four sets of sonar elements 1, 2, 3 and 4 described in FIG. 1 of the U.S. Provisional Application No. 60/868,590. Each set of transceivers may be comprised of the same number of transceivers as the number of sonar elements in the set to which it is connected.

Thus, the pulse generator 1 is connected to each transceiver of each transceiver set 2, 3, 4, 5 through wire connections 6, 7, 8 and 9 and to each sonar element of each of the sonar element sets 10, 11, 12, 13 through wire connections 14, 15, 16 and 17.

Referring again to FIG. 1, although only one wire is shown between the pulse generator 1 and each of the transceiver sets 2, 3, 4 and 5, and between the transceiver sets and the sonar element sets 10, 11, 12 and 13, it is to be understood by one skilled in the art that a wire may be used between the pulse generator 1 and each individual transceiver of each transceiver set. Similarly, a wire may be used between each individual transceiver of each transceiver set and each individual sonar element of each sonar element set. Thus, referring to FIG. 1 of U.S. Provisional Application 60/868,590, sonar element set 1, for example, has eight sonar elements. Therefore, the pulse generator 1 may use eight individual connections to each individual transceiver and another eight individual connections between each individual transceiver and each individual sonar element in that sonar element set. Likewise, the pulse generator 1 may be connected to each of the transceivers and each of the sonar elements of all the other sets, as shown in FIG. 1 of U.S. Provisional Application 60/868,590.

Each of the wire connections to the transceivers, as well as between the transceivers and the sonar elements may be constructed in the same configuration and of the same material and according to precisely the same specifications and size, such that the signal from the pulse generator 1 will reach each of the sonar elements at exactly the same time. It is to be understood by one skilled in the art that the wire connections may be of many different types such as printed circuit board trace and ground plane, twisted pair cable, or coaxial cable or any other method or combinations of methods for making an electrical circuit connection.

In operation, the pulse generator 1 transmits a signal to each transceiver set 2, 3, 4 and 5, and each transceiver transmits an amplified signal to the connected sonar element 10, 11, 12 and 13. The pulse generator 1 may create a pulse signal that is composed of a pulse envelope and pulse frequency signal in the case that the transceivers are simple amplifiers, or the pulse generator 1 may generate a pulse signal that is a simple pulse envelope signal and the transceivers can impose the pulse frequency signal so long as that signal is phase synchronized to the pulse envelope signal. Thereby the pulse signal will reach each sonar element at precisely the same time. Consequently, each sonar element will emit a sonar pulse at exactly the same time as all the other sonar elements. Accordingly, each sonar element will be listening for the sonar pulses reflected from targets at exactly the same time, thereby completely eliminating the interference between the adjacent sonar elements.

The most pronounced interference between adjacent sonar elements can occur if all sonar elements utilize the same frequency. However, an exemplary embodiment is not restricted to one particular sonic frequency. Since the method of an exemplary embodiment can work with the invention of U.S. Provisional Application No. 60/868,590, each sonar element could utilize the same or different sonic frequency.

As it is known in the art, interference is possible even in the case where multiple frequencies are utilized, due to harmonics. Therefore, another advantage of an exemplary embodiment is that it may eliminate interference due to harmonics interference of multiple frequency sonar pulses.

While an exemplary embodiment was described in connection with the apparatus of the U.S. Provisional Application No. 60/868,590, it should be understood by a person skilled in the art that the method of an exemplary embodiment can be utilized in conjunction with any apparatus consisting of multiple sonar units or sources, or any other means of using frequencies and sound waves to detect target objects and determine the distance to such objects.

Moreover, while an exemplary embodiment was described in relation to a sonar apparatus, it should be understood by a person skilled in the art that the method of exemplary embodiments are not limited to sonar application, but may be used in conjunctions with any application or means of utilizing sound waves or frequencies to detect target objects, including, but not limited to, medical ultrasounds, robotics, radar and the like.

What is claimed is:

1. A system for simultaneously transmitting a sonar signal, comprising:
   a pulse generator;
   a plurality of transceivers connected to the pulse generator; and
   a plurality of sonar elements, with each sonar element connected to one of the transceivers, so that each sonar element emits the sonar signal in synchrony upon receiving a pulse from the pulse generator.

2. The system of claim 1, wherein the plurality of transceivers are arranged into sets.

3. The system of claim 2, wherein the plurality of transceivers are arranged into four sets.

4. The system of claim 1, wherein the plurality of sonar elements are arranged into sets.

5. The system of claim 4, wherein the plurality of sonar elements are arranged into four sets.

6. The system of claim 1, wherein the plurality of transceivers are arranged into sets, and wherein the plurality of sonar elements are arranged into sets.

7. The system of claim 6, wherein the number of the transceivers in each set equals the number of the sonar elements in each set, if the sets are connected.

8. The system of claim 1, wherein the pulse signal from the pulse generator is a composite signal including envelope and frequency signals, and wherein the plurality of transceivers simply amplify the signal that is transmitted to the plurality of sonar elements.

9. The system of claim 1, wherein the pulse signal from the pulse generator is a simple envelope signal and the plurality of transceivers impose a frequency signal on the pulse signal that is transmitted to the plurality of sonar elements.

10. The system of claim 9, wherein the plurality of sonar elements use two or more different frequencies.

11. The system of claim 9, wherein each sonar element of the plurality of sonar elements uses a different frequency.

12. The system of claim 1, wherein the plurality of sonar elements are positioned at the surface of a body of water.

13. The system of claim 12, wherein each of the sonar elements of the plurality of sonar elements sends out a sonar signal below the surface of the water.

14. The system of claim 13, wherein each of the sonar signals intersects at least one other sonar signal.

15. The system of claim 14, wherein each of the sonar signals do not cause interference with the other intersecting sonar signals, due to the synchronization of the transmission.

16. The system of claim 1, further comprising at least one or more connectors between the pulse generator and each of the plurality of transceivers adapted to connect the pulse generator to the plurality of transceivers, wherein each of the connectors are made to identical specifications.

17. The system of claim 1, further comprising at least one or more connectors between each of the plurality of transceivers and each of the plurality of sonar elements adapted to connect the plurality of transceivers to the plurality of sonar elements, wherein each of the connectors are made to identical specifications.

18. The system of claim 1, further comprising:
- at least one or more connectors between the pulse generator and each of the plurality of transceivers adapted to connect the pulse generator to the plurality of transceivers, wherein each of the connectors are made to identical specifications; and
- at least one or more connectors between each of the plurality of transceivers and each of the plurality of sonar elements adapted to connect the plurality of transceivers to the plurality of sonar elements, wherein each of the connectors are made to identical specifications.

19. A method for reducing interference between a plurality of sonar elements, the method comprising the steps of:
- providing a system comprising a pulse generator, a plurality of transceivers connected to the pulse generator, and the plurality of sonar elements each of which is connected to the pulse generator through one of the transceivers;
- transmitting a signal from the pulse generator so that the signal reaches each of the sonar elements in a synchronized manner;
- emitting a sonar pulse based upon the signal from each of the sonar elements in a synchronized manner; and
- receiving at each sonar element a reflection of signal emitted by the sonar element.

20. The system of claim 8, wherein each of the plurality of sonar elements use the same frequency.

21. The system of claim 9, wherein each of the plurality of sonar elements use the same frequency.

* * * * *